United States Patent [19]

Monro

[11] 4,096,771
[45] Jun. 27, 1978

[54] ADJUSTABLE AND FLOATING BORING BAR STABILIZER

[75] Inventor: David Jan Monro, Milford, Conn.

[73] Assignee: USM Corporation, Farmington, Conn.

[21] Appl. No.: 730,746

[22] Filed: Oct. 8, 1976

[51] Int. Cl.$^2$ .................. B23B 29/02; B23B 29/14
[52] U.S. Cl. ........................ 82/35; 82/38 R; 408/83
[58] Field of Search .................. 408/79–83; 82/38, 39, 2 R, 35

[56] References Cited

U.S. PATENT DOCUMENTS

| | | | |
|---|---|---|---|
| 2,334,795 | 11/1943 | Smith | 408/83 |
| 3,091,985 | 6/1963 | Whalen | 82/38 R |
| 3,367,220 | 2/1968 | Copeland | 82/35 |

*Primary Examiner*—Leonidas Vlachos

*Attorney, Agent, or Firm*—William F. White; Richard B. Megley; Vincent A. White

[57] ABSTRACT

The boring bar of a boring plate lathe is provided with a device for maintaining the concentricity of the boring bar within the workpiece. This stabilizer assembly consists of a guide mounted on a piston shaft which is resiliently mounted in a cylindrical housing. The exterior surface of the housing is threaded and is provided with an adjustment nut. The entire stabilizer assembly is fitted into a cavity in the tool head to a depth limited by engagement with the adjustment nut. The stabilizer assembly is positioned on the tool head to enable the guide to extend radially outward to engage the work surface. The resilient force which is exerted by the guide on the work surface can be set by rotation of the adjustment nut to extend or retract the housing in the tool head cavity.

2 Claims, 5 Drawing Figures

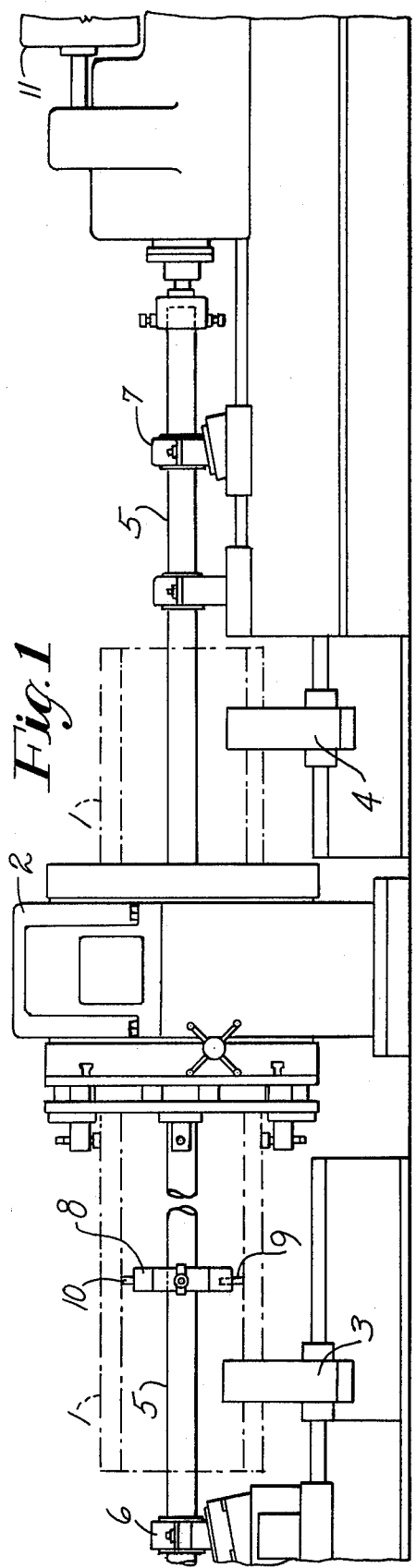
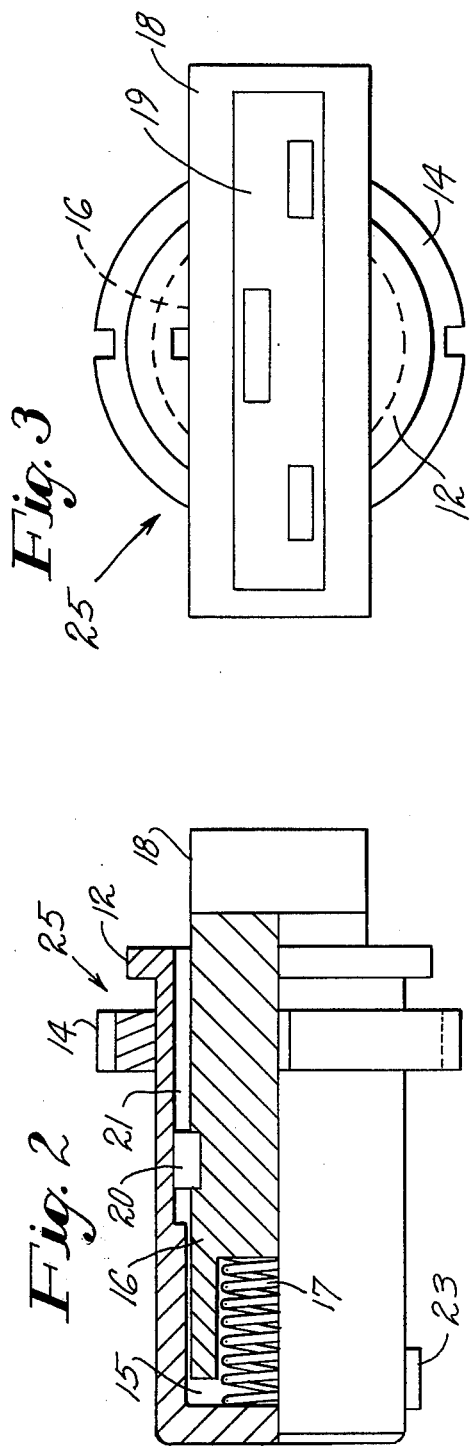

ADJUSTABLE AND FLOATING BORING BAR STABILIZER

BACKGROUND OF THE INVENTION

A boring lathe is constructed for the purpose of turning the inside surface of cylinders. This is accomplished by mounting the cylindrical shell in the lathe for exteriorly driven rotation. A boring bar is inserted concentrically through the shell and is supported and driven in an axial direction. A tool head is secured to the boring bar within the shell and holds the tool or tools in contact with the rotating workpiece as the head axially traverses the length of the workpiece.

The shells or cylinders upon which this work is performed may be quite long, thereby creating the necessity of having a long unsupported span of boring bar within the shell and causing a loss in accuracy due to vibration and deflection. It is therefore a critical problem to support the tool head as it turns the interior cylindrical surface.

In general an assortment of fixed wooden blocks is used as a guidance surface. However, the tool wears as it progresses through the workpiece, thereby gradually reducing the inside diameter of the shell. A fixed guide will therefore become progressively tighter in the bore creating an excessive torque which can overload the drive system. Accordingly, it is the purpose of this invention to provide a guide or stabilizing assembly which will automatically adjust to the progressive reduction of the inside diameter of the workpiece.

BRIEF SUMMARY OF THE INVENTION

The boring head of a boring bar lathe is provided with two pairs of spring biased stabilizer assemblies which may be adjusted in radial position to create a resilient supporting force for the boring bar within the workpiece. Each stabilizer assembly consists of an exteriorly threaded cylindrical housing which is dropped into a receptacle in the tool head. The housing is constructed with a central bore which receives a piston shaft. The axis of the shaft extends radially outward relative to the boring bar and the piston shaft is spring biased towards the inner workpiece surface. At the outer end of the piston shaft there is mounted a guide which provides an engaging surface for the workpiece. The threaded surface of the housing engages a nut which may be adjusted over the length of the housing. The lock nut limits the insertion of the housing into the cavity of the tool head, thereby providing means to adjust the radial extension of the piston shaft and guide. The stabilizer assembly may be preloaded to any desired force but will also adjust to variations in diameter of the workpiece bore because of its resilient support.

DESCRIPTION OF THE DRAWING

The invention is described in more detail below with reference to the attached drawing and in said drawing:

FIG. 1 is a side view of a typical boring lathe in which the subject invention is used;

FIG. 2 is a side view in partial section of the stabilizer assembly;

FIG. 3 is a top view of the stabilizer assembly;

DETAILED DESCRIPTION OF THE PREFERRED EMBODIMENT

Figure 4:
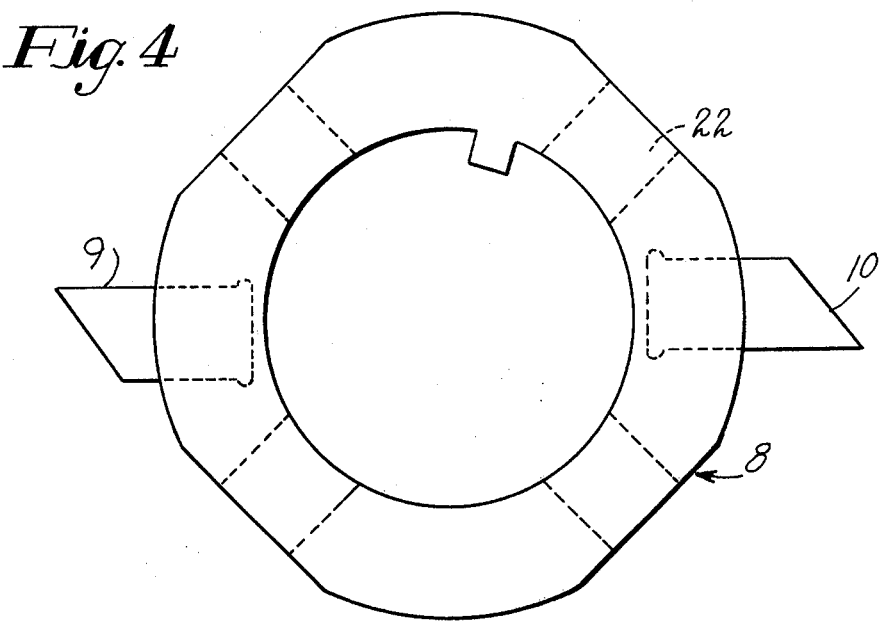
FIG. 4 is a side view of a tool head showing the receptacles for the stabilizer assembly.

The boring lathe with which this invention is associated is generally of the type shown in FIG. 1. A workpiece 1 is mounted in a drive unit 2 for rotary motion. Additional supports 3 and 4 may also be provided. A boring bar 5 is mounted on carriages 6 and 7 and extends concentrically through the workpiece 1 for movement in an axial direction in operative association with drive unit 11. Secured to the boring bar 5 is a tool head 8 which has tools 9 and 10 mounted thereon. The tool head 8 moves with the boring bar 5 so that the tools 9 and 10 traverse the entire surface of the workpiece as the workpiece turns.

Figure 5:
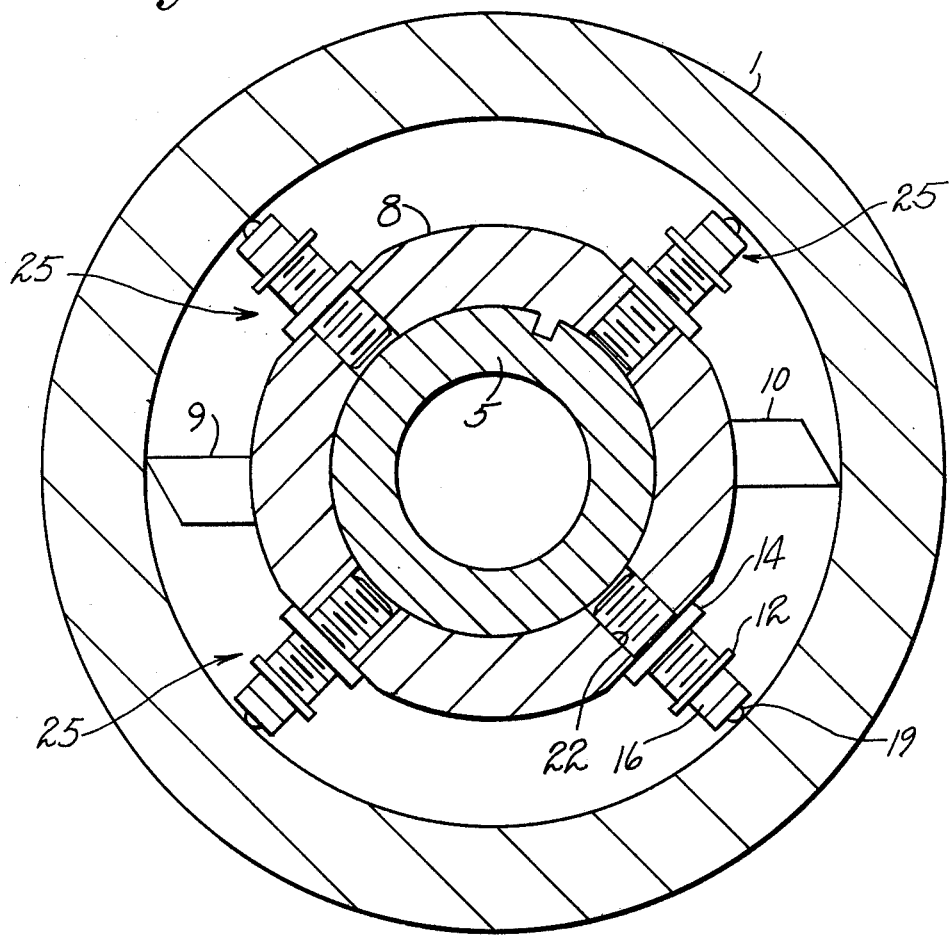
FIG. 5 is a sectional view of a workpiece within which the tool head is shown in operative position.

As best shown in FIGS. 2 and 3 the stabilizer assembly 25 of this invention comprises a cylindrical housing 12 having threads 13 (FIG. 5) constructed in its outer surface. The threads of lock nut 14 engage threads 13 to form a stopping flange which is adjustable over the length of housing 12. A cavity 15 is constructed in the interior of housing 12 to receive a piston shaft 16 for resilient sliding motion therein. The resilient force may be provided by a spring 17 operatively connected to piston shaft 16 to bias the shaft 16 in the outward direction relative to housing 12. A support 18 is connected to the outer end of shaft 16 and is adapted to receive a guide 19 which provides a contact surface with which to engage the workpiece. In order to maintain the guide in appropriate alignment with the direction of travel of the workpiece, the shaft 16 may be provided with a key 20 which engages a slot 21 in the cavity 15 of housing 12. The guide 19 may be any standard guiding device such as a carbide wear pad.

The stabilizer assembly 25 is dropped into a receptacle 22 constructed in the tool head 8. The assembly 25 rests on the flange formed by lock nut 14. Receptacle 22 is positioned so that shaft 16 and guide 19 extend radially outward to engage the workpiece 1. A key 23 may be formed in housing 12 for engagement with a mating slot constructed in the receptacle 22. This will prevent rotation of the assembly 25 during use.

In operation a set of four stabilizer assemblies 25 are positioned at 90° intervals about the circumference of the boring head 8 with the guides 19 extending radially outward. After an initial cut, the stabilizers 25 are inserted in the receptacles 22 and the nuts 14 adjusted to exert a predetermined supporting force on the interior of the workpiece 1. This is accomplished by rotating nut 14 on housing 12 to extend or retract the assembly 25. The guide 19 will resiliently ride on the rotating surface of the workpiece and will therefore automatically adjust to the decreasing diameter of the workpiece bore.

Where the workpiece shell is of small diameter, the stabilizer assemblies 25 may be mounted directly onto the boring bar 5.

I claim:

1. A device for stabilizing the boring bar of a lathe adapted to machine an interior cylindrical surface of a hollow workpiece comprising a tool head mounted on the boring bar and a plurality of assemblies extending radially from the tool head for engaging said interior surface to support and stabilize the boring bar, each assembly including:

A. a cylindrical housing slidably received in the tool head for adjustment radially of the boring bar,
B. a shaft slidable axially in the housing,
C. a guide mounted on the outer end of the shaft, D. spring means in the housing urging the shaft outward radially of the boring bar to engage the guide with said interior surface, and E. a flange threaded on the exterior of the housing and engaging the tool head for adjustably determining the location of the housing radially of the boring bar and thereby adjustably predetermining the resilient stabilizing forces acting against said interior surface.

2. A device according to claim 1 in which the guides are elongate and the housings and the shafts are fixed against rotation on their axes extending radially of the boring bar for orienting the guides for engagement lengthwise along said interior surface.

* * * * *